Oct. 29, 1935.   G. FEAVYEAR ET AL   2,019,125
NONREVERSIBLE METER TRAIN
Filed Dec. 28, 1933
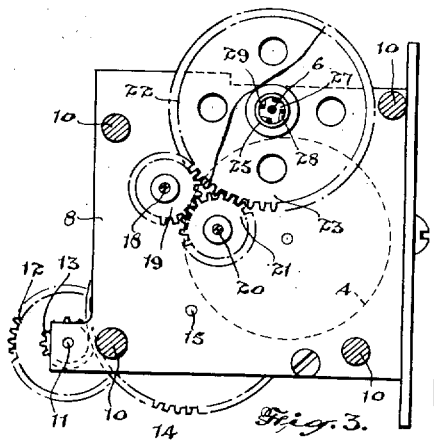
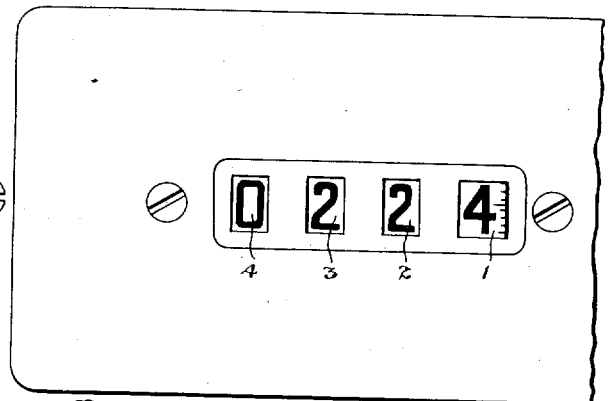
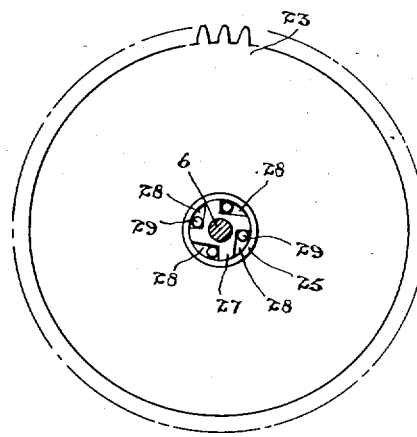
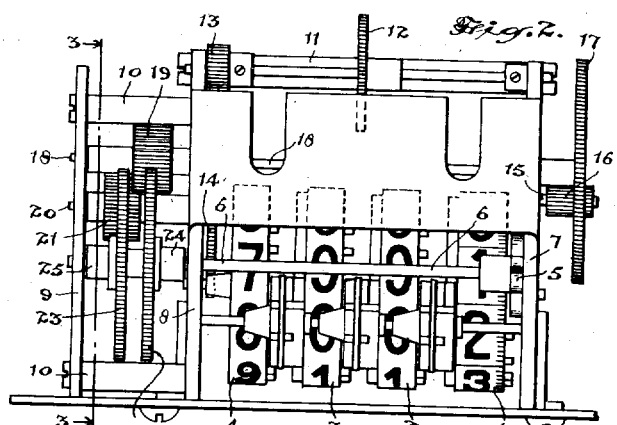
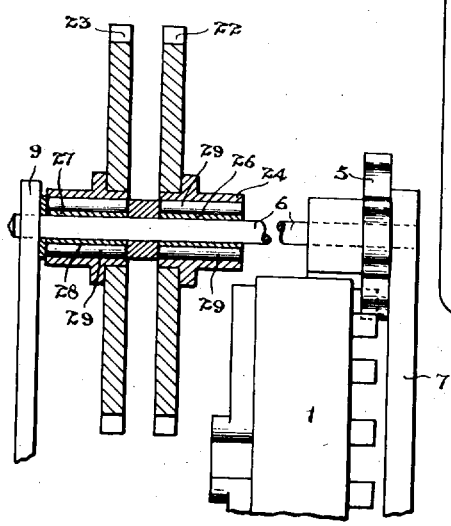
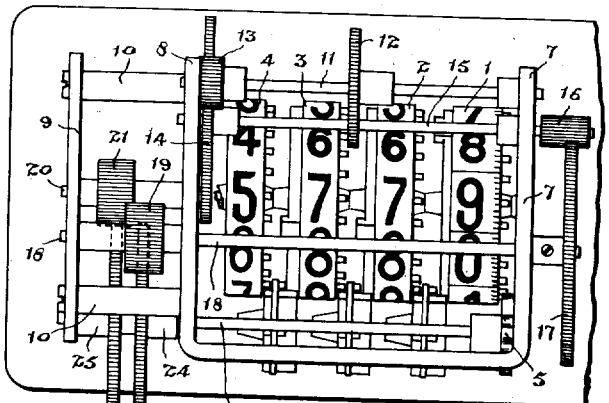
Inventors.
Glenn Feavyear
John Muir.

Patented Oct. 29, 1935

2,019,125

UNITED STATES PATENT OFFICE 2,019,125

NONREVERSIBLE METER TRAIN

Glenn Feavyear, Toronto, Ontario, Canada, and John Muir, Springfield, Ill., assignors to Sangamo Company, Limited, Toronto, Ontario, Canada Application December 28, 1933, Serial No. 704,228

2 Claims. (Cl. 74—367)

The principal object of this invention is to provide a mechanism for use in metering devices which will prevent fraud through the reversal of the registering mechanism, and to devise a very simple, inexpensive and accurate operating mechanism which will cause the registering device to operate with an advance movement only.

The principal feature of the invention consists in interposing in the drive train between a meter and registering mechanism an arrangement of gearing and clutch devices whereby the shaft operating the registering mechanism is rotated in one direction only irrespective of the direction of movement of the meter-operated mechanism.

In the accompanying drawing, Figure 1 is a front elevational view of the face of a registering device for meters.

Figure 2 is a plan view showing our improvement.

Figure 3 is a vertical sectional elevation taken on the line 3—3 of Figure 2.

Figure 4 is an elevational view of the rear side of the registering mechanism.

Figure 5 is an enlarged elevational view of one of the clutch gears showing the clutch in section as on the line 3—3 of Figure 2.

Figure 6 is an enlarged mid-sectional view taken centrally of the axis of the pair of clutch wheels mounted on the shaft of the register gear train.

In the operation of metering devices of various kinds it is customary to attach to the driving shaft of the meter, a registering mechanism which operates through a suitable gear train.

In the structure herein shown, the numerical counting discs 1, 2, 3 and 4 are operated by a pinion 5 mounted on a shaft 6 which is journalled in the end plates 7 and 8, one end thereof extending through the plate 8 and having its extremity journalled in the plate 9. The plate 9 is rigidly supported by studs 10 secured in the plate 8, from which it is spaced.

A shaft 11 mounted between the plates 7 and 8, has arranged intermediate of its length, the gear wheel 12 which is operatively connected with a suitable metering mechanism, which is not here shown. On the shaft 11 at one end thereof is mounted a pinion 13, which meshes with a spur gear 14 mounted on a shaft 15 extending between the end plates 7 and 8.

A pinion 16 is mounted on the end of the shaft 15 extending beyond the plate 7, and this meshes with a spur gear 17 mounted on a shaft 18 extending between the plates 7 and 8 and which projects through the plate 8 and has its extremity journalled in the plate 9.

A spur pinion 19 is mounted on the shaft 18 between the plates 8 and 9. A stud shaft 20 journalled between the plates 8 and 9 adjacent to the shaft 18 has mounted thereon a spur pinion 21 which is arranged in offset relation to the spur pinion 19 and meshes with the aforesaid pinion at one end.

Mounted upon the shaft 6 between the plates 8 and 9, are a pair of spur gears 22 and 23, the gear 22 meshing with the pinion 19, and the gear 23 meshing with the pinion 21. These gears are supported upon cylindrical hubs 24 and 25 respectively, which in turn are rotatably mounted upon the internal clutch members 26 and 27 respectively. These clutch members are each provided with longitudinally arranged recesses 28 in which are mounted the clutch rollers 29 which engage the inner peripheries of the hub. This form of clutch is very well known and it is not considered necessary to either describe or show in detail the accurate configuration of the clutch roller-engaging surfaces. It will of course be understood that when the gear mounted upon one of these clutch hubs is turned in one direction, the clutch rollers abut the shoulders and permit the hub to rotate freely without turning the shaft on which the central or recessed clutch member is mounted, but when the gear is turned in the opposite direction the clutch rollers bind between the inner surface of the hub and the engaging clutch surfaces, and the shaft on which the inner member is mounted is rotated therewith.

It will be readily understood that when the shaft 18 is rotated through its train of gears and the pinion 19 rotates the gear 22 forwardly, the clutch in said gear is arranged to turn the shaft 6 so that it operates the counting discs in a forward direction.

The clutch of the gear 23 corresponds with the clutch of the gear 22 and if the gear 23 is turned in the reverse direction to the gear 22 said gear 23 turns freely, but if the direction of rotation of these gears is reversed, and the gear 22 is turned backward, it will turn freely on the shaft 6, while the gear 23 will, through its clutch drive the shaft forwardly.

When the pinion 19 operates to rotate the gear 22 it also rotates the pinion 21 on the stud shaft 20 and as the gear 23 meshes with the pinion 21, the gear 23 turns in a direction reverse to that of the gear 22, but its backward rotation has no effect upon the shaft 6 as its clutch runs free.

The pinion 19 and gear 22 normally operate continuously to drive the recording mechanism.

In the event of the metering device, to which the registering mechanism is attached, being reversed, the pinion 19 turns the gear 22 in a reverse direction and its clutch turns free on the shaft. The reversal of rotation of the pinion 19 meshing with the pinion 21 reverses the direction of movement of the pinion 21 and of the gear 23 from the normal movement, and when this occurs the clutch of the gear 23 engages the shaft 6 and turns it in a forward direction.

It will be readily understood from this description that when the mechanism is normally operated the gear 22 drives the registering mechanism forwardly and the driving shaft of the registering mechanism turns freely in the clutch of the gear 23, but when the rotation of these gears is reversed the clutch of the gear 22 cannot rotate the shaft backward and the movement of the gear 23 being reversed, is then operating in a forward direction, and it operates its clutch to grip and turn the shaft forward.

The mechanism of the registering device must therefore always move in a forward direction no matter which way the driving shaft operated by the meter is turned, and anyone tampering with the meter to cause it to move in a reverse direction, not only fails to turn the registering device backwardly, but actually turns the same forwardly to add to the total forward movement of the meter.

It will be appreciated that this device is of an extremely simple nature. The type of clutch used is very positive and by the simple arrangement of the interconnection of gears described with the double clutch arrangement, the ordinary type of meter may be made thoroughly theft-proof.

The device is so extremely simple that it may be applied to the ordinary form of registering device with very little alteration and at extremely low cost.

It is also important to note that the small clutching rollers 29 support the gears 22 and 23 concentrically of the shaft 6 and clear of frictional contact therewith which is an important factor in connection with electric meters where only a very small torque is available as the motive force and where the addition of extra friction would seriously affect the accuracy of registration.

What we claim as our invention is:—

1. In a registering device for electric meters driving and driven shafts, a pair of uniformly sized gears mounted on the driven shaft each of said gears having a cylindrical hub, roller clutch means mounted directly on the driven shaft and co-operating respectively with said hubs, said clutches being similarly arranged so that operation of either one of said pair of gears in a forward direction will advance the driven shaft, and gear means meshing with the aforesaid gears and driving said gears simultaneously in opposite directions, including a pair of intermeshing pinions of uniform size, one of said pinions being mounted on the driving shaft and directly meshing with one of said pair of gears and the other comprising an idler pinion meshing with the other of said pair of gears.

2. In a registering device for electric meters, driving and driven shafts, a pinion driven by said driving shaft, a pinion meshing with the aforesaid pinion, a gear wheel mounted on the driven shaft meshing with the first-mentioned pinion and having a clutch arranged to rotate the driven shaft in a forward direction only, and a gear wheel meshing with the second-mentioned pinion and mounted on the driven shaft and having a clutch arranged to rotate the driven shaft in a forward direction only.

GLENN FEAVYEAR.
JOHN MUIR.